United States Patent [19]

Ricaud

[11] 4,409,667

[45] Oct. 11, 1983

[54] PROCESS AND DEVICE FOR THE DERIVATION OF AN ANALOG ELECTRIC SIGNAL

[75] Inventor: Pierre Ricaud, Colomiers, France

[73] Assignee: Societe Nationale Industrielle Aerospatiale, Paris, France

[21] Appl. No.: 265,812

[22] Filed: May 21, 1981

[30] Foreign Application Priority Data

Jun. 4, 1980 [FR] France ............................. 80 12381

[51] Int. Cl.³ ........................... G06F 7/48; G06J 1/00
[52] U.S. Cl. ................................. 364/732; 328/132; 364/605; 364/828
[58] Field of Search ............... 364/565, 566, 605, 732, 364/828; 328/127, 132

[56] References Cited

U.S. PATENT DOCUMENTS

| 3,590,229 | 6/1971 | Humphreys | 364/732 |
| 3,928,756 | 12/1975 | Auray | 364/732 |
| 3,978,414 | 8/1976 | Bober et al. | 328/132 |

*Primary Examiner*—Jerry Smith
*Attorney, Agent, or Firm*—Merriam, Marshall & Bicknell

[57] ABSTRACT

The present invention relates to a process and device for obtaining the derivation of an analog electric signal P varying slowly as a function of a variable t. According to the invention, a combination of analog means, digital means, analog-to-digital conversion means and digital-to-analog conversion means is used to form the ration ($\Delta P/\Delta t$). The invention is applicable to a vertical speed indicator for aircraft.

12 Claims, 2 Drawing Figures

PROCESS AND DEVICE FOR THE DERIVATION OF AN ANALOG ELECTRIC SIGNAL

The present invention relates to a process and a device for obtaining the derivative of an analog electric signal varying slowly as a function of a parameter.

In the present specification, and as will be seen hereinafter, the adverb "slowly" is in relation to the speed of processing of the electronic elements composing the device according to the invention.

The invention is applied more particularly, but not exclusively, to the very precise calculation of the vertical speeds of aircraft cabins, with a view to effecting regulation thereof in pressure variation, or after correction, in ascending or descending speeds.

The device according to the invention is therefore particularly suitable for processing the signals issuing from barometric pressure sensors, i.e. from pressure analog electric signal transducers.

More precisely, it therefore constitutes a high precision vertical speed indicator.

In the present technique, pneumatic and electronic vertical speed indicators are known.

The former do not furnish information exploitable for slow variations in pressure and are especially used as flight indicators, particularly in aircraft of simple design.

The latter use pressure analog electric signal transducers and said signal is derived with the aid of an R.C. circuit and an amplifier in order to furnish a vertical speed signal. The precision of the signal furnished is insufficient to indicate slow variations intended to be exploited for regulation of internal pressure of a pressurised aircraft cabin.

It is an object of the present invention to overcome these drawbacks by providing a combination of digital technology and of analog technology enabling a very high resolution to be obtained.

To this end, according to the invention, the process for obtaining the derivative of an analog electric signal P varying slowly as a function of a variable t, is noteworthy in that a first analog value $P_1$ taken by said signal P for a first value $t_1$ of the variable t is converted into a first digital value which is memorised durably and which is permanently and at least partially reconverted into an analog value $P_{12}$, and a first analog difference $\delta P = P_1 - P_{12}$ is formed, which is then converted into a second digital value which is also memorised, after which a second analog value $P_2$ taken by said signal P for a second value $t_2$ of the variable t and said analog value $P_{12}$ are compared, to form a second analog difference $P_2 - P_{12}$ which is converted into a third digital value, then said second digital value is subtracted from this third digital value, so as to form the digital value of a third difference $\Delta P = P_2 - P_1$ and the digital value of this third difference is divided by the digital value of the difference $\Delta t = t_2 - t_1$ of the values $t_2$ and $t_1$ of said variable t.

Thus, the ratio $$\frac{\Delta P}{\Delta t} = \frac{P_2 - P_1}{t_2 - t_1}$$

is obtained in digital form.

In order to obtain a high resolution, the formation of said first and second analog differences is advantageously accompanied by a high gain amplification.

As the reconverted analog value $P_{12}$ is eliminated by itself in the calculation, it is not indispensable for it to be absolutely equal to $P_1$.

Under these conditions, it suffices that the analog value $P_{12}$ be obtained by digital-to-analog conversion of the bits of highest weight of said first digital code representative of the analog value $P_1$.

As will be seen hereinafter, the first difference $\delta P = P_1 - P_{12}$ virtually corresponds to the error introduced by the device for carrying out the invention in the value of P by the double conversion and the intermediate memory storage.

Of course, the succession of the different operations may be repeated permanently, to give the ratio $\Delta P/\Delta t$ continuously.

The invention may be carried out to obtain the derivative of any analog electric signal P, function of any variable t. However, in a particularly advantageous application of the invention, mentioned hereinabove, it is advantageous if the analog electric signal P is representative of the pressure outside or inside an aircraft as a function of the altitude thereof, this altitude itself being a function of time t.

A device for carrying out the invention is associated with a generator of the analog electric signal P and advantageously comprises a multiplexer with two inputs and one single output provided with means for controlled link between each of said inputs and said output, one of said inputs of the multiplexer receiving the signal P from said generator; a comparator whose output is connected to the other input of said multiplexer and of which one input also receives the signal P coming from the generator; an analog-to-digital converter whose input is connected to the output of said multiplexer; a first memory intended to receive from said analog-to-digital converter at least a part of the first digital value representative of the analog value $P_1$; a digital-to-analog converter which is permanently linked to said first memory and of which the output is connected to the other input of said comparator; a second memory intended to receive from said analog-to-digital converter said second digital value representative of said first difference $\delta P = P_1 - P_{12}$ and control, clock and calculating means intended selectively to control said means for controlled link of the multiplexer, to direct said first digital value towards said first memory, to direct said second digital value towards said second memory, to subtract said second digital value from the third to form the digital value of the third difference $\Delta P = P_2 - P_1$, to form the digital value of the difference $\Delta t = t_2 - t_1$ and to divide the digital values of $\Delta P$ and $\Delta t$.

Said comparator is advantageously formed by a high gain differential amplifier, determined by the value of two resistors of which one is mounted between the input, connected to the digital-to-analog converter, and the output of said differential amplifier, whilst the other of said resistors is mounted in the link between the digital-to-analog converter and said differential amplifier.

The invention will be more readily understood on reading the following description with reference to the accompanying drawings, in which.

Figure 2:
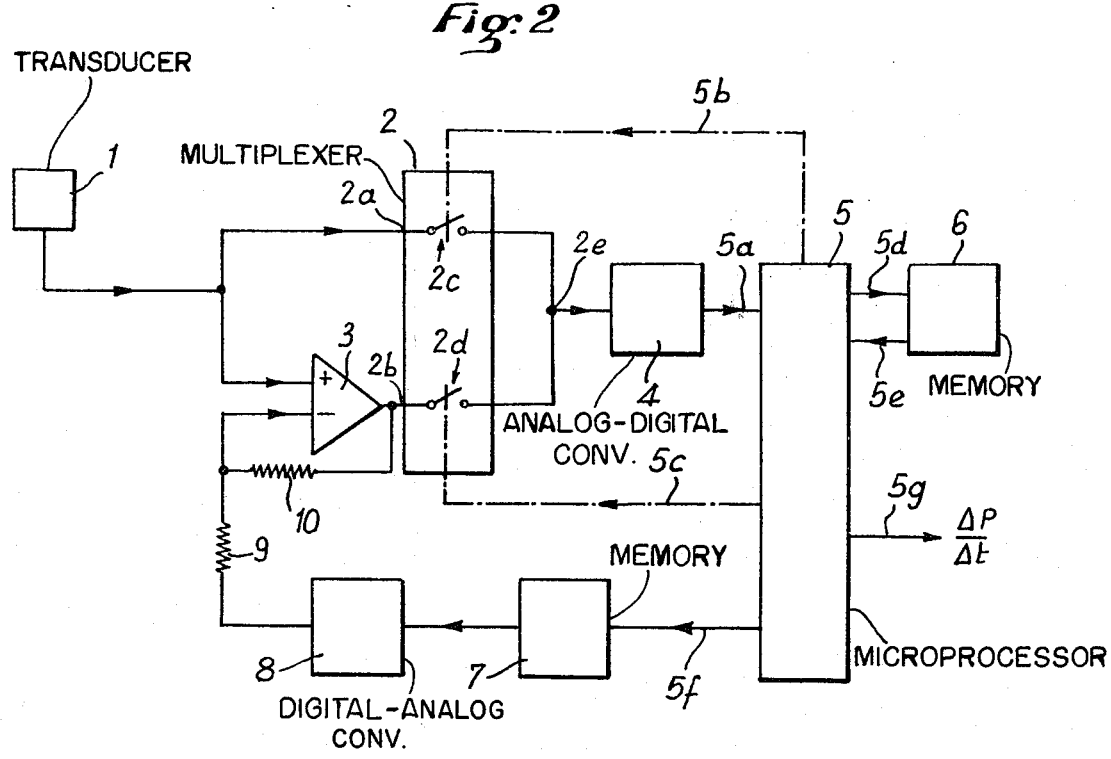
FIG. 2 is the block diagram of an embodiment of the device according to the invention.

Referring now to the drawings, the device according to the invention, shown in FIG. 2, comprises a transducer 1 adapted to deliver an analog electric signal P representative of a pressure, for example an atmospheric pressure varying as a function of the altitude from 0 to 3000 m. The signal P varies for example by 10 millivolts per millibar and, for example, the pressure varies by one millibar per second.

Figure 1:
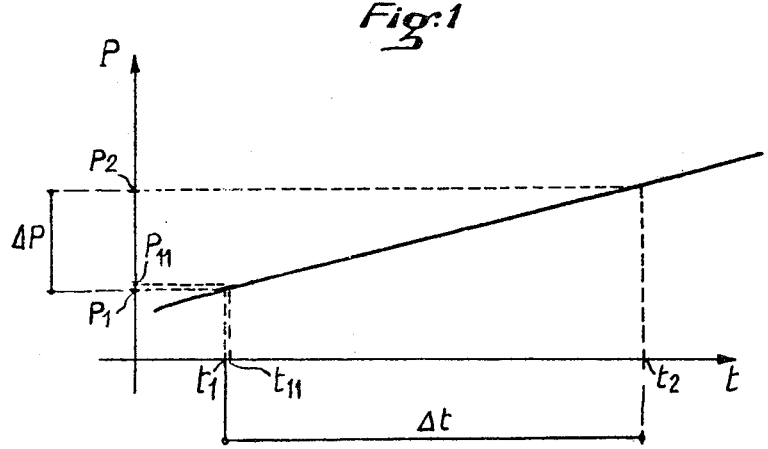
FIG. 1 is a time diagram intended to illustrate the functioning of the device according to the invention.

The device of FIG. 2 is for example mounted on board an aircraft. Thus, when, at instant $t_1$, the aircraft is at a certain altitude $A_1$, the signal P furnished by the transducer 1 presents the value $P_1$, whilst, at instant $t_2$, when the aircraft is located at another altitude $A_2$, the signal P takes a different value $P_2$. This is shown in FIG. 1 which illustrates the variation of the signal P as a function of time t.

The output of the transducer 1 is connected in parallel, on the one hand, to a first input 2a of a multiplexer circuit 2 and, on the other hand, to the positive input of a differential amplifier 3, of which the gain is for example equal to 256, or $2^8$. In FIG. 2, the multiplexer 2 is shown schematically as comprising two switches 2c and 2d in parallel on each other and respectively in series between two inputs 2a and 2b of the multiplexer 2 and the single output 2e thereof.

The output of the differential amplifier 3 is connected to the input 2b of the multiplexer 2, whilst the output 2e thereof is connected to an analog-to-digital converter 4, for example with 12 bits, of which the output is connected by a link 5a to a microprocessor 5. By links 5b and 5c, the microprocessor 5 is adapted to control the switches 2c and 2d.

By other links 5d and 5e, the microprocessor 5 is linked to a memory 6.

Moreover, another memory 7 is connected to the microprocessor 5 by a link 5f. The output of the memory 7 is connected to a digital-to-analog converter 8, for example with 8 bits, of which the output is connected to the negative input of the differential amplifier 3 by a resistor 9.

Furthermore, a resistor 10 is mounted between the output and the negative input of the differential amplifier 3. Thus, the resistors 9 and 10 enable the gain of the differential amplifier 3 to be determined.

The process of functioning of the device according to the invention comprises three successive and respectively repetitive sequences, controlled by the clock and counting means of the microprocessor 5.

The first sequence of functioning is produced at instant $t_1$ and, at this moment, the microprocessor closes the switch 2c and opens the switch 2d (due to the links 5b and 5c), so that the value $P_1$ is transferred directly to the converter 4 which digitalises it with a resolution of 12 bits and transmits to the microprocessor 5 the corresponding digital value.

This microprocessor selects the eight bits of highest weight of this digital value with 12 bits, representative of the value $P_1$ and transfers them, via link 5f, in the memory 7, where they remain stored until the end of the process.

The digital-to-analog converter 8 converts these eight bits into an analog value $P_{12}$, applied to the negative input of the differential amplifier 3, via the resistor 9. Due to the memory 7, the analog value $P_{12}$ remains permanently, on the output of the converter 8, until the end of the process.

This first sequence is sufficiently rapid and the variation of the signal P is sufficiently slow for it to be considered that, during its development, said signal P has not evolved, i.e. at instant $t_{11}$ at which this first sequence terminates, the corresponding value $P_{11}$ is virtually equal to $P_1$. Consequently, the difference signal $\delta P$ which appears at instant $t_{11}$ at the output of the amplifier 3 and which is equal to $\delta P = P_{11} - P_{12}$ is virtually equal to $\delta P = P_1 - P_{12}$.

Under these conditions, $\delta P$ represents the error introduced by the device on the value $P_1$ and due to the double conversion (by converters 4 and 8) and by the intermediate storage (in memory 7).

In the second sequence of the process (at instant $t_{11}$), the microprocessor 5 opens the switch 2c and closes the switch 2d so that the difference signal $\delta P$ is transmitted to the converter 4 which digitalises it, after which said microprocessor 5 enters in the memory 6 (via link 5d) the value with 12 bits representative of $\delta P$. The microprocessor 5 then opens the switch 2d, the switch 2c also remaining open.

The switches 2d and 2c are thus maintained open during a time slot $\Delta t$, for example equal to 1 second, leading to instant $t_2$.

At the end of the time slot $\Delta t$, i.e. at instant $t_2$, the third sequence begins, the microprocessor 5 then closing the switch 2d. At instant $t_2$, the positive input of the differential amplifier 3 receives value $P_2$ from transducer 1, whilst the negative input of said amplifier always receives the value $P_{12}$ from the converter 8. At the output of the differential amplifier 3, the difference $P_2 - P_{12}$ therefore appears, which is digitalised by the converter 4 then transmitted to the microprocessor 5.

The latter then calls the difference signal $\delta P$ from the memory 6 (via link 5e) and subtracts it from the difference $P_2 - P_{12}$, so that it forms the value $$P_2 - P_{12} - \delta P = P_2 - P_{12} - (P_1 - P_{12}) = P_2 - P_1 = \Delta P$$

Thus, at its output 5g, the microprocessor may furnish the ratio $\Delta P/\Delta t$, i.e. the speed of variation of the pressure P as a function of time t.

After a term of read-out of the signal $\Delta P/\Delta t$ at the output 5g, the memories 6 and 7 and the converters 4 and 8 are returned to zero. The switch 2d is open and the switch 2c is closed and a new cycle may recommence.

It will be noted that, although using only an analog-to-digital converter of 12 bits, a relative resolution of 20 bits is obtained on the ratio $\Delta P/\Delta t$, if the accumulated derivatives of the differential amplifier 3 and of the digital-to-analog converter 8 are less during $\Delta t$ than the value of the 20th bit of the maximum digitalised amplitude of P, which is perfectly possible. This relative resolution is due to the amplification by $2^8 (=256)$ of the difference signals, with respect to the direct measurement of P.

In fact, the maximum pressure variation being of the order of 1 millibar per second, $\Delta P$ will always be less than the 256th part of P, taking into account the fact that $\Delta t$ is of the order of 1 second. After $\Delta t$, at the input of the amplifier 3, there will therefore be two signals of which the difference is small or of the order of P/256, with a resolution of 8 bits for the signal applied to the negative input, therefore with a significance on the 256th part of said signal.

Now, the multiplication by 256 ($2^8$) of this difference, effected by the amplifier 3, returns the analog value of the difference signal to the level of the value of the analog signal representative of P and issuing from the detector 1.

On this analog difference, a significance is obtained on the 4096th part, due to the analog-to-digital conversion with 12 bits effected by the converter 4, said conversion being made possible over the whole scale of said converter, by the amplification by 256. A significance is therefore obtained on the $256 \times 4096 = 1\,048\,576$th part ($2^{20}$) of P, i.e. a significance on the variation $\Delta P$ corresponding to the twentieth bit of P, with a substantially fixed shift or fixed error (which in any case is taken into account to form the error signal of the circuit) directed in particular on the four bits of lowest weight of the digital-to-analog conversion of the first sequence of the process according to the invention.

What is claimed is:

1. Process for obtaining the derivative of an analog electric signal P varying slowly as a function of a variable t, comprising the steps of:

converting a first analog value $P_1$ taken by the signal P for a first value $t_1$ of the variable t to a first digital value;

reconverting said first digital value to an analog value $P_{12}$ representative of $P_1$;

forming a first analog difference $\delta P = P_1 - P_{12}$;

converting $\delta P$ to a second digital value;

forming a second analog difference ($P_2 - P_{12}$) by subtracting $P_{12}$ from a second analog value $P_2$ taken by said signal P for a second value $t_2$ of the variable t;

converting said second analog difference to a third digital value;

subtracting said second digital value from said third digital value to form a digital difference $\Delta P = P_2 - P_1$; and dividing $\Delta P$ by the digital value of the difference $\Delta t = t_2 - t_1$ between said values $t_2$ and $t_1$ of said variable t.

2. The process of claim 1, wherein the formation of said first and second analog differences is accompanied by a high gain amplification.

3. The process of claim 1, wherein the analog value $P_{12}$ is obtained by digital-to-analog conversion of the bits of highest weight of said first digital value representative of the analog value $P_1$.

4. The process of claim 1, wherein the succession of the different operations is permanently repeated to give the ratio $\Delta P / \Delta t$ continuously.

5. The process of claim 1, wherein the analog electric signal P is representative of the pressure outside or inside an aircraft as a function of the altitude thereof, this altitude being itself a function of time t.

6. Apparatus for obtaining the derivative of an analog electrical signal P varying slowing as a function of a variable t, comprising:

means for converting a first analog value $P_1$ taken by the signal P for a first value $t_1$ of the variable t to a first digital value;

means for reconverting said first digital value to an analog value $P_{12}$ representative of $P_1$;

means for forming a first analog difference $\delta P = P_1 - P_{12}$;

means for converting $\delta P$ to a second digital value;

means for subtracting $P_{12}$ from a second analog value $P_2$ taken by said signal P for a second value $t_2$ of the variable t to form a second analog difference ($P_2 - P_{12}$);

means for converting said second analog difference to a third digital value;

means for subtracting said second digital value from said third digital value to form a digital difference $\Delta P = P_2 - P_1$; and means for dividing $\Delta P$ by the digital value of the difference $\Delta t = t_2 - t_1$ between said values $t_2$ and $t_1$ of said variable t.

7. Apparatus in accordance with claim 6, wherein said means for forming said first and said second analog differences comprises a high gain differential amplifier.

8. Device for obtaining the derivative of an analog electric signal P varying slowing as a function of a variable t, associated with a generator of the analog electric signal P, comprising:

a multiplexer having two inputs and a single output and means for selective connection between each of said inputs and said output, one of said inputs receiving said signal P;

a comparator having an output connected to the other input of said multiplexer, and two inputs, one of which receives said signal P, said comparator producing an analog output signal representing the difference $\delta P$ between said signal P and a signal $P_{12}$ supplied to the other of its said inputs;

an analog-to-digital converter having an input connected to the output of said multiplexer;

a first memory adapted to receive from said analog-to-digital converter a first digital signal representative of said analog signal P;

a digital-to-analog converter responsive to said first digital signal from said first memory producing an analog output $P_{12}$ supplied to the other input of said comparator;

a second memory adapted to receive from said analog-to-digital converter a second digital signal representative of said difference $\delta P$; and control, clock and calculating means adapted selectively to control said means for connection between the inputs and the output of said multiplexer, to direct to said first memory a first digital signal $P_1$ from said analog-to-digital converter representative of said signal P when t is $t_1$, to direct said second digital signal representative of $\delta P$ to said second memory, to subtract said second digital signal form a third digital signal from said analog-to-digital converter representative of a second value $P_2$ of said signal P when t is $t_2$ to form the digital value of the difference $\Delta P = P_2 - P_1$, to form the digital value of the difference $\Delta t = t_2 - t_1$, and to divide the digital value of $\Delta P$ by the digital value of $\Delta t$.

9. The device of claim 8, wherein said comparator is formed by a high gain differential amplifier, determined by the value of two resistors of which one is mounted between the input, connected to the digital-to-analog converter, and the output of said differential amplifier, whilst the other of said resistors is mounted in the link between the digital-to-analog converter and said differential amplifier.

10. The device of claim 8, wherein the analog-to-digital converter has a greater resolution than the digital-to-analog converter.

11. The device of claim 8, wherein said control, clock and calculating means are constituted by a microprocessor.

12. The device of claim 8 wherein said generator comprises a barometric pressure transducer of an aircraft, whereby the output of said device represents vertical speed.

* * * * *